US012574839B2

(12) United States Patent
Sugawara

(10) Patent No.: US 12,574,839 B2
(45) Date of Patent: Mar. 10, 2026

(54) NON-TRANSITORY COMPUTER-READABLE STORAGE MEDIUM STORING PROGRAM AND METHOD

(71) Applicant: CANON KABUSHIKI KAISHA,
Tokyo (JP)

(72) Inventor: Wahei Sugawara, Kanagawa (JP)

(73) Assignee: CANON KABUSHIKI KAISHA,
Tokyo (JP)

( * ) Notice: Subject to any disclaimer, the term of this patent is extended or adjusted under 35 U.S.C. 154(b) by 397 days.

(21) Appl. No.: 18/202,329

(22) Filed: May 26, 2023

(65) Prior Publication Data

US 2023/0388916 A1 Nov. 30, 2023

(30) Foreign Application Priority Data

May 31, 2022 (JP) ................................. 2022-088881

(51) Int. Cl.
*H04W 12/77* (2021.01)
*H04L 9/40* (2022.01)
*H04W 12/00* (2021.01)
*H04W 48/20* (2009.01)

(52) U.S. Cl.
CPC ........... *H04W 48/20* (2013.01); *H04L 63/205* (2013.01); *H04W 12/009* (2019.01); *H04W 12/77* (2021.01)

(58) Field of Classification Search
CPC .... H04W 12/009; H04W 12/77; H04L 63/205
See application file for complete search history.

(56) References Cited

U.S. PATENT DOCUMENTS

| | | | |
|---|---|---|---|
| 9,344,957 | B2 | 5/2016 | Suga |
| 9,900,830 | B2 | 2/2018 | Suga |
| 10,645,640 | B2 | 5/2020 | Suga |
| 10,719,280 | B2 | 7/2020 | Shibata |
| 11,347,448 | B2 | 5/2022 | Shibata |

(Continued)

FOREIGN PATENT DOCUMENTS

| | | |
|---|---|---|
| JP | 2015-023441 A | 2/2015 |
| JP | 2019-180036 A | 10/2019 |
| JP | 2019-193120 A | 10/2019 |

OTHER PUBLICATIONS

Aran Kunimatsu, U.S. Appl. No. 18/202,333, filed May 26, 2023.

*Primary Examiner* — William S Powers
(74) *Attorney, Agent, or Firm* — VENABLE LLP

(57) ABSTRACT

An information processing apparatus able to communicate with a communication apparatus, when a network setup for causing the communication apparatus to connect to an access point existing outside the information processing apparatus and the communication apparatus is performed, acquires, as a network setup information, information of a security method supported by the communication apparatus, and information indicating whether the communication apparatus supports the network setup based on a predetermined standard. Based on the acquired network setup information, the network setup is performed by a first method based on the predetermined standard, on at least a condition the security method is supported by the communication apparatus and the network setup based on the predetermined standard, and when the condition is not satisfied, the network setup is performed by a second method different from the first method.

11 Claims, 7 Drawing Sheets

(56)          References Cited

U.S. PATENT DOCUMENTS

| | | | |
|---|---|---|---|
| 11,635,925 | B2 | 4/2023 | Shibata |
| 2006/0063594 | A1* | 3/2006 | Benbrahim ......... G07F 17/3223 |
| | | | 463/42 |
| 2007/0266236 | A1* | 11/2007 | Colditz .............. H04L 63/0428 |
| | | | 713/153 |
| 2015/0007302 | A1* | 1/2015 | Kato .................. H04L 63/0823 |
| | | | 726/10 |
| 2017/0142649 | A1* | 5/2017 | El-Moussa ........... H04W 48/20 |
| 2019/0334892 | A1 | 10/2019 | Goto |
| 2019/0381665 | A1* | 12/2019 | Storr ................. G06Q 10/0631 |
| 2021/0392142 | A1* | 12/2021 | Stephens .............. H04L 63/104 |

* cited by examiner

IS IT OKAY TO SEND ACCESS POINT INFORMATION TO COMMUNICATION APPARATUS?

301

SELECT DIFFERENT ACCESS POINT

302

NO

303

YES

FIG. 3B

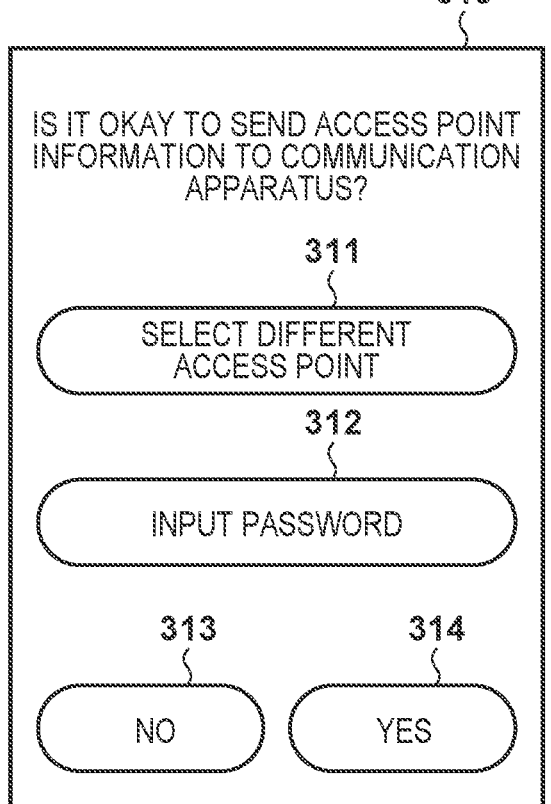

310

IS IT OKAY TO SEND ACCESS POINT INFORMATION TO COMMUNICATION APPARATUS?

311

SELECT DIFFERENT ACCESS POINT

312

INPUT PASSWORD

313

NO

314

YES

FIG. 4A

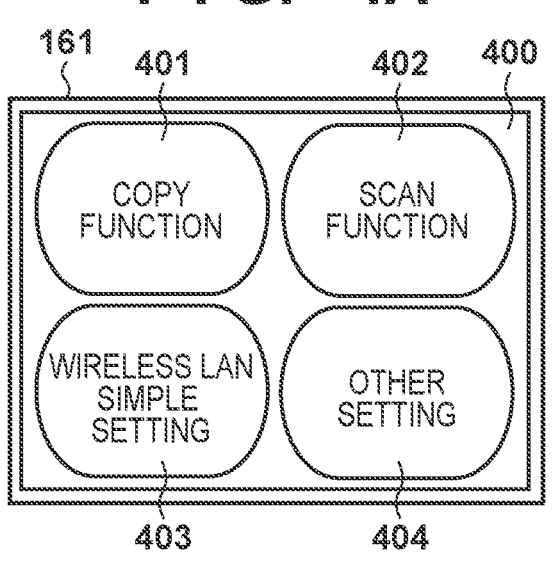

161   401   402   400

COPY FUNCTION

SCAN FUNCTION

WIRELESS LAN SIMPLE SETTING

OTHER SETTING 403   404

FIG. 4B

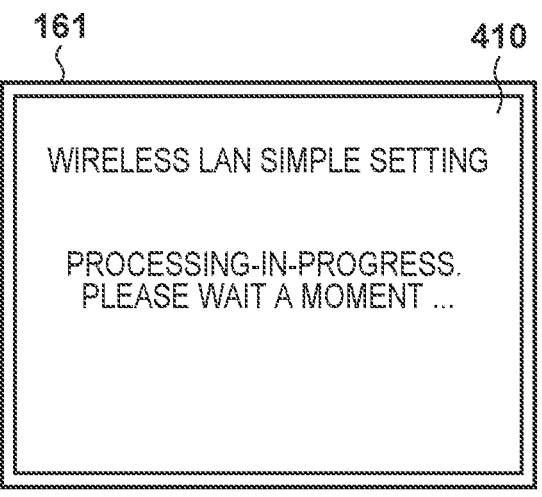

161   410

WIRELESS LAN SIMPLE SETTING

PROCESSING-IN-PROGRESS. PLEASE WAIT A MOMENT ...

F I G.  4C
161    420
WIRELESS LAN SIMPLE SETTING
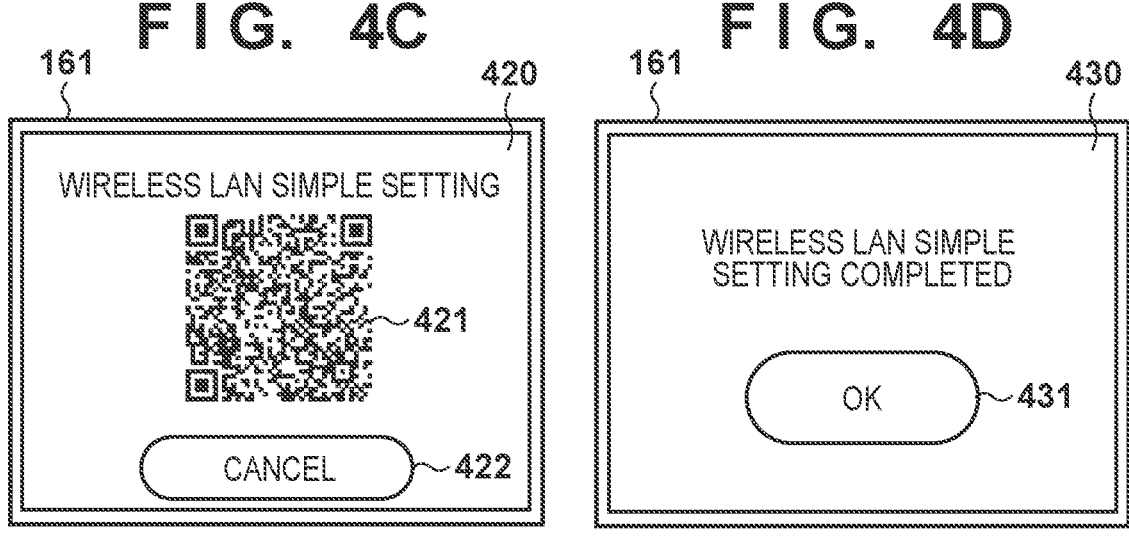
~421
CANCEL ~422
F I G.  4D
161    430
WIRELESS LAN SIMPLE
SETTING COMPLETED
OK ~431
F I G.  4E
161    440
WIRELESS LAN SIMPLE
SETTING COMPLETED
OK ~441
F I G.  4F
161    450
WIRELESS LAN SIMPLE
SETTING TIMED OUT
OK ~451

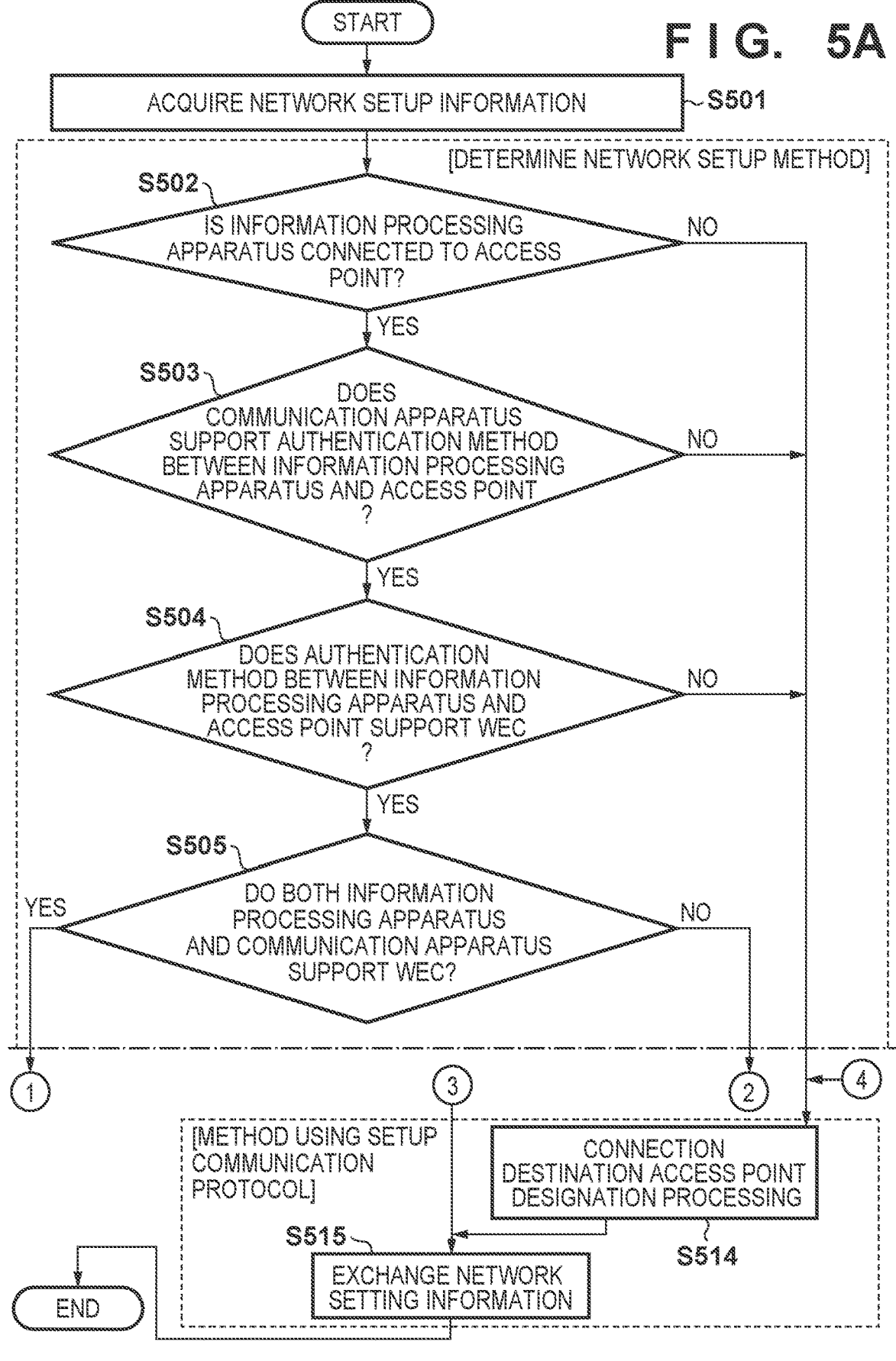
F I G. 5A

NON-TRANSITORY COMPUTER-READABLE STORAGE MEDIUM STORING PROGRAM AND METHOD

BACKGROUND OF THE INVENTION

Field of the Invention

The present invention relates to a non-transitory computer-readable storage medium storing program configured to perform setting concerning connection between apparatuses, and a method.

Description of the Related Art

There is known a technique in which an information processing apparatus such as a Personal Computer (PC) transmits information concerning an access point to a communication apparatus such as a printer to connect the communication apparatus and the external apparatus (Japanese Patent Laid-Open No. 2015-023441).

As one technique, a mechanism, called Wi-Fi Easy Connect (WEC), for transmitting/receiving network information between apparatuses using Device Provisioning Protocol (DPP) has been standardized by the Wi-Fi Alliance. In WEC, examples of a Bootstrapping method for triggering transmission/reception of network information are a QR code, Bluetooth Low Energy (BLE), and Near Field Communication (NFC). Then, communication is started by providing a public key to a communication partner apparatus. Japanese Patent Laid-Open Nos. 2019-193120 and 2019-180036 describe setting of communication parameters using a QR code.

In a wireless communication method using a wireless LAN based on the IEEE802.11 standard, a network is protected by authenticating a communication apparatus to be connected to the network. Examples of an authentication method of the wireless LAN are a Pre Shared Key (PSK) method using a PSK, and a Simultaneous Authentication of Equals (SAE) method using an SAE. Furthermore, as the authentication method of the wireless LAN, there is provided an EAP method of authenticating a communication apparatus to be connected to a network using an authentication server complying with IEEE802.1X/EAP.

SUMMARY OF THE INVENTION

The present invention provides a mechanism of improving convenience of a network setup for connecting a communication apparatus to an access point in an arrangement in which a security method is used in a network formed by the access point.

The present invention in one aspect provides a non-transitory computer-readable storage medium storing a program configured to cause a computer of an information processing apparatus to function to: acquire information of a security method used with an access point to which the information processing apparatus, which is wirelessly communicable with a communication apparatus, is connected; acquire capability information of the information processing apparatus and capability information of the communication apparatus; and decide, based on the acquired information of the security method, the acquired capability information of the information processing apparatus, and the acquired capability information of the communication apparatus, a network setup method for connecting the communication apparatus to the access point.

According to the present invention, it is possible to provide a mechanism of improving convenience of a network setup for connecting a communication apparatus to an access point in an arrangement in which a security method is used in a network formed by the access point.

Further features of the present invention will become apparent from the following description of exemplary embodiments with reference to the attached drawings.

BRIEF DESCRIPTION OF THE DRAWINGS

FIGS. 3A and 3B are views each showing a UI screen of the information processing apparatus;

FIGS. 4A to 4F are views each showing a UI screen of the communication apparatus;

FIGS. 5A and 5B are flowcharts illustrating processing of selecting a network setup method.

DESCRIPTION OF THE EMBODIMENTS

Figure 1:
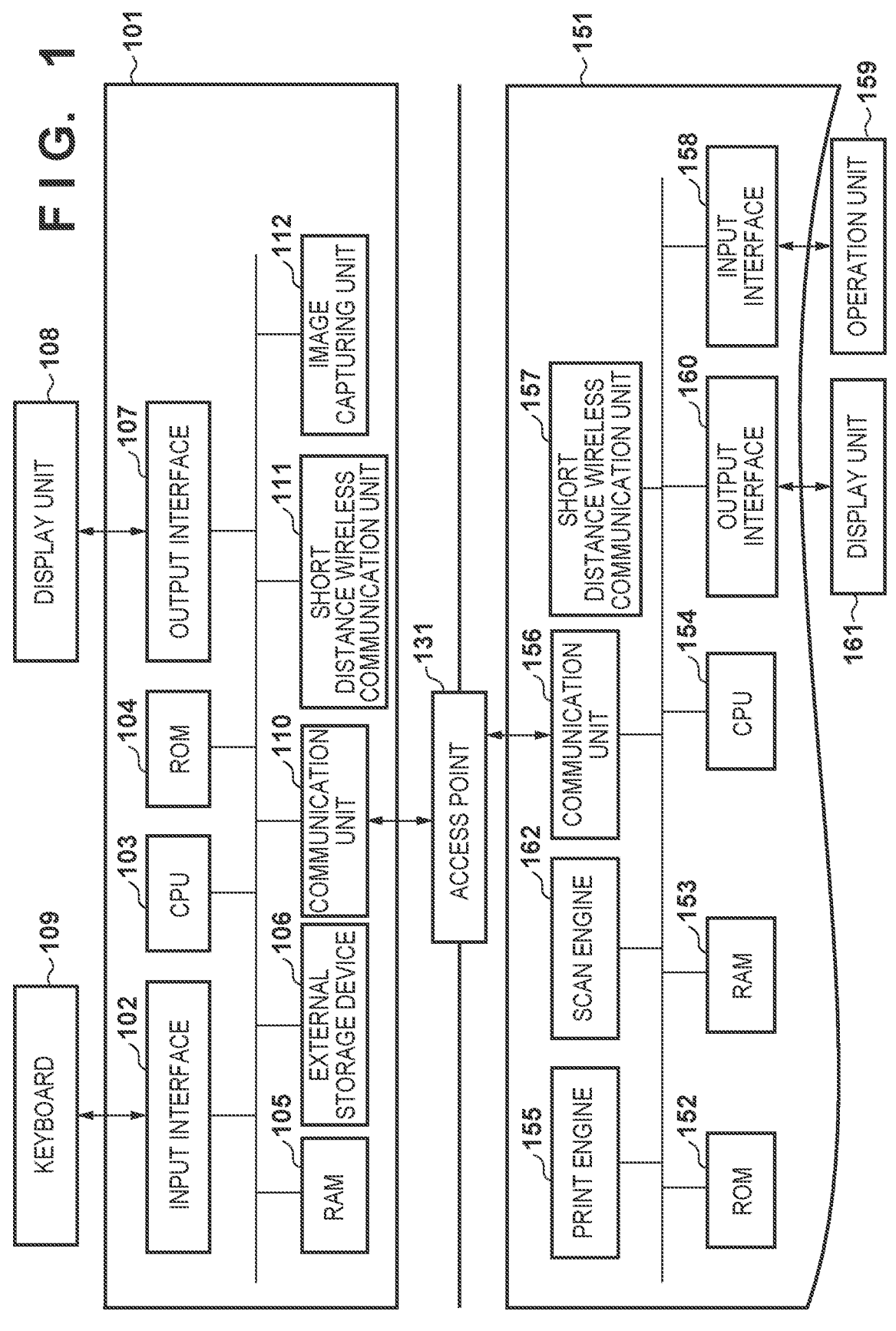
FIG. 1 is a block diagram showing the arrangement of a system including an information processing apparatus and a communication apparatus.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

Depending on a combination of a security method used in a network formed by an access point and capabilities of an information processing apparatus and a communication apparatus, a network setup may fail, thereby degrading convenience.

According to the present disclosure, it is possible to provide a mechanism of improving convenience of a network setup for connecting a communication apparatus to an access point in an arrangement in which a security method is used in a network formed by the access point.

First Embodiment

An information processing apparatus and a communication apparatus included in a communication system according to this embodiment will be described. In this embodiment, a smartphone is exemplified as the information processing apparatus but the present invention is not limited to this. For example, as the information processing apparatus, various kinds of apparatuses such as a portable terminal, a Personal Computer (PC), a tablet terminal, a Personal Digital Assistant (PDA), and a digital camera are applicable. In this embodiment, a printer is exemplified as the communication apparatus but the present invention is not limited to this, and various kinds of apparatuses are applicable as long as they can perform wireless communication with the information processing apparatus. For example, concerning a printer, an inkjet printer, a full-color laser beam printer, a monochrome printer, and the like are applicable. Furthermore, not only a printer but also a copying machine, a facsimile apparatus, a portable terminal, a smartphone, a laptop, a tablet terminal, a PDA, a digital camera, a music playback device, a television, a smart speaker, and the like are applicable. In addition, a multi-function peripheral having a plurality of functions such as a copying function, a FAX function, and a print function is applicable.

In this embodiment, if the information processing apparatus supports a function called Wi-Fi Easy Connect (to be referred to as WEC® hereinafter), it can execute this function. WEC is a function of executing a network setup of another apparatus using Device Provisioning Protocol (to be referred to as DPP hereinafter) defined by the Wi-Fi Alliance. Note that a network setup of another apparatus especially indicates processing of connecting another apparatus to an access point forming a network. In WEC, an apparatus (to be referred to as a Configurator apparatus hereinafter) operating in the role of "Configurator" and an apparatus (to be referred to as an Enrollee apparatus hereinafter) operating in the role of "Enrollee" communicate with each other. Note that in this embodiment, the Configurator apparatus serves as an Initiator in DPP, and the Enrollee apparatus serves as a Responder in DPP. In Bootstrapping, the Configurator apparatus acquires Bootstrapping information from the Enrollee apparatus. To acquire the Bootstrapping information, a method using, for example, a QR code®, Bluetooth Low Energy (BLE), Near Field Communication (NFC), or other communication is used. The Bootstrapping information includes, for example, identification information (MAC address or the like) of the Enrollee apparatus, and public key information to be used to execute secure communication with the Enrollee apparatus. In this embodiment, the Bootstrapping information is described as "WEC associated information". Note that other information may be processed as WEC associated information. Then, the Configurator apparatus executes wireless communication with the Enrollee apparatus using the acquired Bootstrapping information. More specifically, for example, the Configurator apparatus communicates with the Enrollee apparatus using the public key included in the Bootstrapping information. Furthermore, the Configurator apparatus generates a common key based on the information obtained by the communication, and transmits, to the Enrollee apparatus, information encrypted using the common key. Note that the transmitted information is especially, for example, connection information for connection to the access point. Then, the Enrollee apparatus establishes wireless connection to the access point using the connection information received from the Configurator apparatus. Note that in network setup processing by WEC according to this embodiment, the information processing apparatus supporting WEC operates as the Configurator apparatus, and the communication apparatus supporting WEC operates as the Enrollee apparatus.

First, the arrangement of the information processing apparatus according to this embodiment and the communication apparatus which is communicable with the information processing apparatus according to this embodiment will be described with reference to a block diagram shown in FIG. 1. Although the following components are exemplified in this embodiment, this embodiment is applicable with respect to an apparatus which is communicable with the communication apparatus, and the present invention is not limited to the components shown in FIG. 1.

An information processing apparatus 101 is the information processing apparatus according to this embodiment. The information processing apparatus 101 includes an input interface 102, a CPU 103, a ROM 104, a RAM 105, an external storage device 106, an output interface 107, a display unit 108, a communication unit 110, a short distance wireless communication unit 111, and an image capturing unit 112. The CPU 103, the ROM 104, the RAM 105, and the like form a computer of the information processing apparatus 101.

The input interface 102 is an interface configured to accept data input and operation instructions from the user when an operation unit such as a keyboard 109 is operated. Note that the operation unit may include a physical keyboard and physical buttons, or may include a software keyboard and software buttons displayed on the display unit 108. That is, the input interface 102 may accept input (operation) from the user via the display unit 108.

The CPU 103 is a system control unit and controls the whole information processing apparatus 101. The ROM 104 stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is formed by a Static Random Access Memory (SRAM) or the like, which needs a backup power supply. Note that the RAM 105 can store important data such as program control variables without volatilization because the data are held by a primary battery (not shown) for data backup. In addition, a memory area for storing setting information of the information processing apparatus 101, management data of the information processing apparatus 101, and the like is also provided in the RAM 105. Furthermore, the RAM 105 is also used as the main memory and the work memory of the CPU 103.

The external storage device 106 stores an application program (to be referred to as a setting application hereinafter) configured to perform a network setup of a communication apparatus 151, a print information generation program that generates print information interpretable by the communication apparatus 151, and the like. The setting application is, for example, an application program configured to set an access point as the connection destination of the communication apparatus 151 by WEC or the like. Note that the setting application may have functions other than the network setup function. For example, the setting application may have a function of causing the communication apparatus 151 to execute printing, a function of scanning a document set in the communication apparatus 151, a function of confirming the state of the communication apparatus 151, and the like. The setting application is stored in the external storage device 106 by being installed from an external server by, for example, Internet communication via the communication unit 110. Furthermore, the external storage device 106 stores various kinds of programs such as an information transmission/reception control program to be transmitted/received to/from the communication apparatus 151 connected via the communication unit 110, and various kinds of information to be used by the programs.

The output interface 107 is an interface configured to perform control for causing the display unit 108 to display data or make a notification concerning the state of the information processing apparatus 101. The display unit 108 is formed by a Light-Emitting Diode (LED), a Liquid Crystal Display (LCD), or the like and displays data or makes a notification concerning the state of the information processing apparatus 101.

The communication unit 110 is a component connected to the apparatus such as the communication apparatus 151 or an access point 131 to execute data communication. For example, the communication unit 110 can be connected to an access point (not shown) in the communication apparatus 151. If the communication unit 110 and the access point in the communication apparatus 151 are connected, the information processing apparatus 101 and the communication apparatus 151 can communicate with each other. Note that the communication unit 110 may directly communicate with the communication apparatus 151 by wireless communication, or may perform communication via an external apparatus existing outside the information processing apparatus 101 and the communication apparatus 151. Note that examples of the external apparatus include an external access point (the access point 131 or the like) existing outside the information processing apparatus 101 and the communication apparatus 151, and an apparatus, other than the access point, that can relay communication. In this embodiment, as a wireless communication method used by the communication unit 110, Wireless Fidelity (Wi-Fi) which is a communication standard based on the IEEE802.11 series is used. WEC described above can be executed by communication by the communication unit 110. In addition, for example, a device such as a wireless LAN router is used as the access point 131. Note that in this embodiment, the method of directly connecting the information processing apparatus 101 and the communication apparatus 151 without intervention of an external access point is called a direct connection method. In addition, the method of connecting the information processing apparatus 101 and the communication apparatus 151 via the external access point is called an infrastructure connection method.

The short distance wireless communication unit 111 is a component wirelessly connected to the apparatus such as the communication apparatus 151 in a short distance to execute data communication, and performs communication by a communication method different from that of the communication unit 110. The short distance wireless communication unit 111 can be connected to a short distance wireless communication unit 157 in the communication apparatus 151. As the communication method, for example, Near Field Communication (NFC), Bluetooth® Classic, Bluetooth Low Energy (BLE), Wi-Fi Aware, or the like is used.

The image capturing unit 112 operates when an application operating on the information processing apparatus 101 executes an image capturing function. If the application executes the image capturing function, for example, information acquired from the image capturing unit 112 is processed by the CPU 103, and displayed as a live view on the display unit 108. At this time, if the application executes an image capturing operation, information acquired from the image capturing unit 112 is processed by the CPU 103, and stored as a captured image in the RAM 105. Furthermore, if the application executes a QR code acquisition function, the information acquired from the image capturing unit 112 is processed by the CPU 103, and analyzed as a QR code, thereby acquiring various kinds of information included in the QR code. An example of the information included in the QR code is WEC associated information. Note that in this embodiment, a QR code is processed as an example of a two-dimensional code. In this embodiment, the information processing apparatus 101 executes WEC by the OS of the information processing apparatus 101 based on an execution instruction of network setup processing by the setting application.

The communication apparatus 151 serves as the communication apparatus of this embodiment. The communication apparatus 151 includes a ROM 152, a RAM 153, a CPU 154, a print engine 155, a scan engine 162, a communication unit 156, and the short distance wireless communication unit 157. The ROM 152, the RAM 153, the CPU 154, and the like form a computer of the communication apparatus 151.

The communication unit 156 includes, as the access point in the communication apparatus 151, an access point for connection to the apparatus such as the information processing apparatus 101. Note that the access point can be connected to the communication unit 110 of the information processing apparatus 101. If the communication unit 156 enables the access point, the communication apparatus 151 operates as the access point. Note that the communication unit 156 may directly, wirelessly be connected to the information processing apparatus 101 or may wirelessly be connected to the information processing apparatus 101 via the access point 131. In this embodiment, as the wireless communication method used by the communication unit 156, a communication standard based on the IEEE802.11 series is used. In the following description, Wireless Fidelity (Wi-Fi)® (Wi-Fi communication) indicates a communication standard based on the IEEE802.11 series. If the communication apparatus 151 supports WEC, WEC described above is executed by communication by the communication unit 156. The communication unit 156 may include a hardware component functioning as an access point or may operate as an access point by software for functioning as an access point.

The communication apparatus 151 of this embodiment can operate in an infrastructure mode or a Peer-To-Peer (P2P) mode as a mode for performing communication using the communication unit 156.

The infrastructure mode is a mode in which the communication apparatus 151 communicates with another apparatus such as the information processing apparatus 101 via an external apparatus (for example, the access point 131) forming a network. Connection to the external access point, which is established by the communication apparatus 151 operating in the infrastructure mode, is called infrastructure connection hereinafter. In this embodiment, in the infrastructure connection, the communication apparatus 151 operates as a station and the external access point operates as a master. Note that in this embodiment, the master is an apparatus that decides a communication channel used in a network to which the master belongs, and the station is an apparatus that does not decide a communication channel used in a network to which the station belongs, and uses the communication channel decided by the master.

The P2P mode is a mode in which the communication apparatus 151 directly communicates with another apparatus such as the information processing apparatus 101 without intervention of an external apparatus forming a network. In this embodiment, the P2P mode includes an AP mode in which the communication apparatus 151 operates as an access point. In the AP mode, connection information (SSID and password) of the access point enabled in the communication apparatus 151 can arbitrarily be set by the user. Note that the P2P mode may include, for example, a WFD mode in which the communication apparatus 151 performs communication by Wi-Fi Direct (WFD). Note that which of a plurality of WFD-capable apparatuses operates as a master is decided in accordance with, for example, the Group Owner Negotiation procedure. Note that the master may be decided without executing the Group Owner Negotiation procedure. An apparatus that is a WFD-capable apparatus and serves as a master is especially called a Group Owner. Direct connection to another apparatus, which is established by the communication apparatus 151 operating in the P2P mode, is called direct connection. In this embodiment, in the direct connection, the communication apparatus 151 operates as a master and the other apparatus operates as a station.

Furthermore, in this embodiment, the communication apparatus 151 can operate in a network setup mode as a mode of executing a network setup of the communication apparatus 151 by accepting a predetermined operation from the user. If the communication apparatus 151 operates in the network setup mode, it uses the communication unit 156 to operate as a setup access point which is enabled during the operation in the network setup mode. The setup access point is an access point different from an access point enabled in the above-described AP mode. Furthermore, assume that the SSID of the setup access point includes a predetermined character string that can be recognized by the setting application of the information processing apparatus 101. Assume also that the setup access point is an access point that does not require a password for connection. In addition, assume that the communication apparatus 151 operating in the network setup mode uses a predetermined communication protocol (setup communication protocol) in communication with the information processing apparatus 101 connected to the setup access point. More specifically, the setup communication protocol is, for example, Simple Network Management Protocol (SNMP). Another practical example of the setup communication protocol is Hypertext Transfer Protocol (HTTP). If a predetermined time elapses after the start of the operation in the network setup mode, the communication apparatus 151 stops the operation in the network setup mode, and disables the setup access point. This is because the setup access point is an access point that does not require a password, as described above, and thus if the access point is enabled for a long time, an inappropriate apparatus highly probably requests connection. Note that the setup access point may be an access point that requires a password. In this case, a password used for connection to the setup access point is a fixed password (unchangeable by the user) that is grasped in advance by the setting application.

Furthermore, in this embodiment, the communication apparatus 151 can operate in a mode for executing a network setup of the communication apparatus 151 by a communication protocol different from the setup communication protocol. This embodiment assumes that the communication protocol different from the setup communication protocol is DPP described above, and this mode is called a DPP waiting mode. Upon receiving a network setup request by DPP from the information processing apparatus 101 in a state in which the communication apparatus 151 operates in the DPP waiting mode, the communication apparatus 151 executes a network setup by DPP. Therefore, in other words, the DPP waiting mode is a mode for waiting for a network setup request by DPP.

The short distance wireless communication unit 157 is a component wirelessly connected to the apparatus such as the information processing apparatus 101 in a short distance, and can be connected to, for example, the short distance wireless communication unit 111 in the information processing apparatus 101. As the communication method, for example, NFC, Bluetooth Classic, BLE, Wi-Fi Aware, or the like is used.

The CPU 154 is a system control unit and controls the whole communication apparatus 151. The RAM 153 is formed by an SRAM or the like, which needs a backup power supply. Note that the RAM 153 can store important data such as program control variables without volatilization because the data are held by a primary battery (not shown) for data backup. In addition, a memory area for storing setting information of the communication apparatus 151, management data of the communication apparatus 151, and the like is also provided in the RAM 153. Furthermore, the RAM 153 is used as the main memory and the work memory of the CPU 154, and functions as a reception buffer configured to temporarily store print information received from the information processing apparatus 101 or the like, or stores various kinds of information. The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152.

Based on information stored in the RAM 153 or a print job received from the information processing apparatus 101 or the like, the print engine 155 forms an image on a print medium such as a paper sheet by applying a printing material such as ink onto the print medium, and outputs the print result. Note that in general, the data amount of the print job transmitted from the information processing apparatus 101 or the like is large, and thus it is necessary to use, for communication of the print job, a communication method that allows high-speed communication. Therefore, the communication apparatus 151 receives the print job via the communication unit 156 that can perform communication at a speed higher than that of the short distance wireless communication unit 157.

Based on an input from an operation unit 159 or a scan job received from the information processing apparatus 101 or the like, the scan engine 162 reads image data or document data from a set document or the like. The read data is stored as a scan result in the RAM 153 or transmitted to the information processing apparatus 101 or the like. Note that in general, the data amount of the scan result transmitted from the communication apparatus 151 to the information processing apparatus 101 or the like is large, and thus it is necessary to use, for communication of the scan result, a communication method that allows high-speed communication. Therefore, the communication apparatus 151 transmits the scan result via the communication unit 156 that can perform communication at a speed higher than that of the short distance wireless communication unit 157.

Note that a memory such as an external HDD or an SD card may be attached as an optional device to the communication apparatus 151, and information stored in the communication apparatus 151 may be stored in the memory.

An input interface 158 is an interface configured to accept data input and operation instructions from the user when the operation unit 159 such as a physical button is operated. Note that the operation unit 159 may include a software keyboard and software buttons displayed on a display unit 161. That is, the input interface 158 may accept input from the user via the display unit 161. An output interface 160 is an interface configured to perform control for causing the display unit 161 to display data or make a notification concerning the state of the communication apparatus 151. The display unit 161 is formed by a Light-Emitting Diode (LED), a Liquid Crystal Display (LCD), or the like and displays data or makes a notification concerning the state of the communication apparatus 151. Note that in this embodiment, the operation unit 159 and the display unit 161 are configured as an operation display unit formed from a touch panel display.

In this embodiment, the communication units 110 and 156 execute communication parameter sharing processing for sharing communication parameters between the apparatuses. The communication parameter sharing processing is processing in which a providing-side apparatus provides communication parameters for wireless communication to a reception-side apparatus, and can be performed in each of the infrastructure mode and the P2P mode. In this case, the communication parameters include, for example, wireless communication parameters necessary for wireless LAN communication, such as a Service Set Identifier (SSID) as a network identifier, an encryption method, an encryption key, an authentication method, and an authentication key. The communication parameters also include identification information such as a MAC address, a password, an IP address for communication on the IP layer, and information necessary for higher level services. The communication parameter sharing processing executed by the communication units 110 and 156 may be, for example, Wi-Fi Protected Setup (WPS) defined by the Wi-Fi Alliance. In the communication parameter sharing processing executed by the communication units 110 and 156, a method of safely transferring the communication parameters using public-key cryptography may be used.

The communication apparatus 151 also includes a barcode generation control unit. The barcode generation control unit is not shown in FIG. 1 but is implemented when, for example, the CPU 154 executes a program. The barcode generation control unit generates code information such as a barcode, a two-dimensional code, or a QR code, and executes control to display the generated code information on the display unit 161. The barcode generation control unit displays, on the display unit 161, a QR code or the like obtained by encoding information necessary to set the communication parameters. Note that the display unit 161 may be a component capable of displaying software buttons and the like as an input interface of the user.

Figure 2:
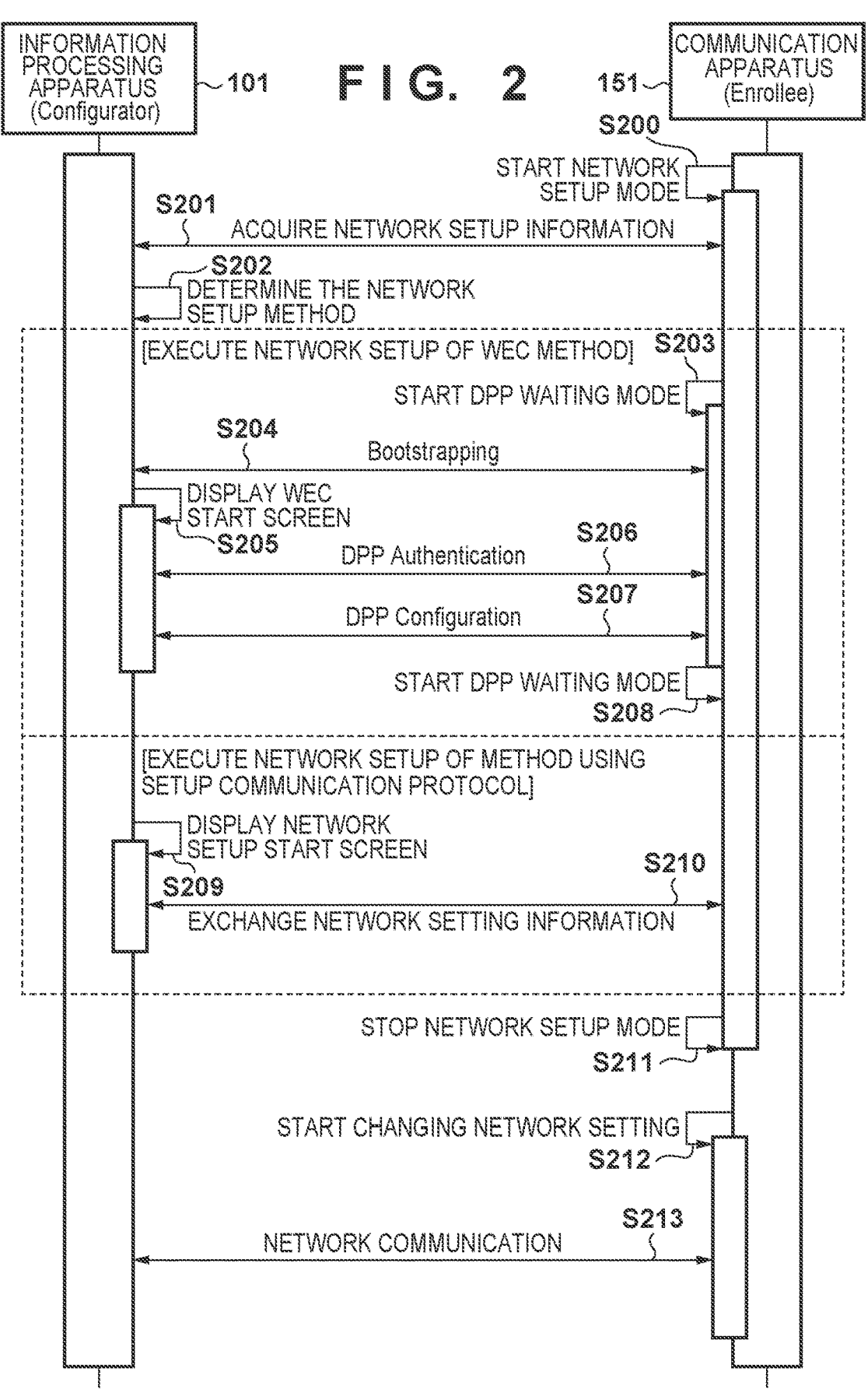
FIG. 2 is a sequence chart showing processing executed by the information processing apparatus and the communication apparatus.

Processing executed by the information processing apparatus 101 and the communication apparatus 151 in WEC using DPP will be described with reference to FIGS. 2 and 3. A sequence shown in FIG. 2 is implemented when, for example, the CPU of each apparatus reads out a program stored in the ROM of each apparatus, the external storage device, or the like to the RAM of each apparatus and executes the program.

In S200, the communication apparatus 151 starts the network setup mode. A trigger for starting the network setup mode may be, for example, a user operation via the operation unit 159 or reception of a specific signal from an external apparatus such as the information processing apparatus 101. Practical examples of the reception of the specific signal from the external apparatus such as the information processing apparatus 101 are reception of a specific BLE beacon and reception of specific wireless LAN communication. After the start of the network setup mode of the communication apparatus 151, the information processing apparatus 101 can be connected to the setup access point to perform communication by the setup communication protocol.

Next, in S201, network setup information is acquired from each of the information processing apparatus 101 and the communication apparatus 151. The information acquired from the information processing apparatus 101 in S201 includes at least one of information representing whether the information processing apparatus 101 supports WEC and information concerning a security method indicating the SSID, authentication method, and encryption method of the access point. The information acquired from the communication apparatus 151 in S201 includes information indicating whether the communication apparatus 151 supports WEC, information concerning a security method supported by the communication apparatus 151, and information concerning a setup method supported by the communication apparatus 151. Note that the network setup information may include the connection information (SSID and password) of the access point enabled in the AP mode in the communication apparatus 151. The information processing apparatus 101 may acquire the network setup information from the communication apparatus 151 using short distance wireless communication such as NFC or BLE. Note that the contents of the network setup information may vary depending on the type, the model, and the like of the communication apparatus 151, and a region.

Next, in S202, the information processing apparatus 101 selects, using the network setup information acquired in S201, one of a WEC method and a method using the setup communication protocol to execute a network setup. Details of this processing will be described later with reference to FIGS. 5A and 5B.

If the WEC method is selected as a network setup method in S202, the process advances to S203. If the method using the setup communication protocol is selected in S202, the process advances to S209.

In S203, the communication apparatus 151 starts the DPP waiting mode. A trigger for starting the DPP waiting mode may be, for example, a user operation via the operation unit 159 or reception of a specific signal from an external apparatus such as the information processing apparatus 101. Practical examples of the reception of the specific signal from the external apparatus such as the information processing apparatus 101 are reception of a specific BLE beacon and reception of specific wireless LAN communication. After the start of the DPP waiting mode, it is possible to read WEC associated information. For example, if a QR code is used to acquire Bootstrapping information in S204, the communication apparatus 151 generates a QR code based on the WEC associated information, and displays it on the display unit 161. The communication apparatus 151 can wait for a network setup request by the WEC method (the method using DPP) and a network setup request by a method not using WEC (the method using the setup communication protocol) at the same time (simultaneously).

In S204, the information processing apparatus 101 acquires the WEC associated information as the Bootstrapping information. For example, if a QR code is used to acquire the Bootstrapping information, the information processing apparatus 101 executes a QR code capturing function in the setting application. The QR code capturing function captures the QR code using the image capturing unit 112, and analyzes the QR code from the captured image. This allows the setting application to acquire the WEC associated information included in the QR code.

In S205, the information processing apparatus 101 starts WEC using DPP by the function of the OS. More specifically, first, if the information processing apparatus 101 is connected to the setup access point of the communication apparatus 151, the information processing apparatus 101 disconnects the connection, and reestablishes connection to the access point 131. Next, the information processing apparatus 101 instructs, from the setting application, the OS to activate a WEC application, thereby activating the WEC application. Thus, the WEC application operates in the foreground and the setting application operates in the background. Note that, for example, execution of the instruction corresponds to an instruction to execute WEC. Thus, the information processing apparatus 101 displays a WEC start screen by the WEC application. Note that the WEC application is a program installed in advance in the information processing apparatus 101, and is a program provided by the OS vendor of the information processing apparatus 101. If the WEC application is activated, the WEC associated information acquired by the setting application is provided to the WEC application. FIG. 3A shows an example of the WEC start screen displayed by the WEC application. Regions 301, 302, and 303 are displayed on a WEC start screen 300. The region 301 is a region for changing an access point set as a setting target of WEC. Note that before the region 301 is operated, the access point set as the setting target of WEC is the access point currently connected to the information processing apparatus 101, and is, for example, the access point 131. If the region 301 is selected, the information processing apparatus 101 displays a list of access points, and newly sets an access point selected from the list by the user as the setting target of WEC. Note that the list of access points includes access points to which the information processing apparatus 101 has been connected once. The region 302 is a region for accepting a cancel instruction of execution of WEC, and the region 303 is a region for accepting an execution instruction of WEC. If the region 302 is operated, the information processing apparatus 101 ends the processing shown in the sequence chart. If the region 303 is pressed, the information processing apparatus 101 advances to S206.

In S205, the WEC application of the information processing apparatus 101 executes API for WEC using the WEC associated information and information concerning the access point set as the setting target of WEC, thereby instructing the OS to execute WEC. Then, in S206, processing called DPP Authentication is executed between the information processing apparatus 101 and the communication apparatus 151 by the function of the OS. In the DPP Authentication, authentication information, information used to encrypt information, and the like are communicated between the information processing apparatus 101 and the communication apparatus 151, thereby authenticating communication between the apparatuses. Note that various kinds of information transmitted from the information processing apparatus 101 in the communication of the DPP Authentication are encrypted based on the WEC associated information acquired from the communication apparatus 151 by the information processing apparatus 101. More specifically, in the DPP Authentication, first, the information processing apparatus 101 transmits an Authentication Request as a network setup request by DPP. The communication apparatus 151 operating in the DPP waiting mode is operating in the DPP waiting mode that is a mode for waiting for the Authentication Request. Therefore, the communication apparatus 151 receives the Authentication Request transmitted from the information processing apparatus 101. Upon receiving the Authentication Request, the communication apparatus 151 attempts to decrypt the received Authentication Request using a decryption key currently held by the communication apparatus. If the decryption succeeds, the communication apparatus 151 transmits an Authentication response to the information processing apparatus 101, thereby authenticating communication with the information processing apparatus 101. Note that if the information processing apparatus 101 cannot acquire correct WEC associated information, and cannot encrypt the information correctly, decryption by the communication apparatus 151 fails. Therefore, authentication fails, and no Authentication response is transmitted. When the information processing apparatus 101 receives the Authentication response, the DPP Authentication is completed. Furthermore, in the DPP Authentication, communication is executed using DPP.

Next, in S207, processing called DPP Configuration is executed between the information processing apparatus 101 and the communication apparatus 151 by the function of the OS of the information processing apparatus 101. In the DPP Configuration, the information processing apparatus 101 transmits connection information for connection to the access point set as the setting target of WEC to the communication apparatus 151 by WEC. Note that the connection information includes at least one or more of pieces of information representing the SSID, password, authentication method, encryption method, certificate of the access point set as the setting target of WEC. The password transmitted at this time is information input by the user on a screen displayed by an application supported by the OS when the connection between the information processing apparatus 101 and the access point is established. This is information held by the OS when the connection between the information processing apparatus 101 and the access point is established. Furthermore, the password is information that is not held by the setting application. Since the password transmitted at this time is information already held by the OS, and the DPP Configuration is processing executed by the OS, the password need not newly be input by the user on the screen displayed by the setting application. In this embodiment, when the connection information is transmitted by WEC, the input of the password is not newly accepted from the user on the screen displayed by the setting application and registration of the certificate in the communication apparatus 151 is not accepted from the user. In addition, access point connection information can be transmitted from the information processing apparatus 101 to the communication apparatus 151 by secure communication. Note that even in the DPP Configuration, communication is executed using DPP.

In S208, upon completion of the DPP Configuration, the communication apparatus 151 ends the DPP waiting mode, and advances to S211. The DPP waiting mode is ended by, for example, the end of display of the QR code. If the operation in the DPP waiting mode is ended, the communication apparatus 151 transitions to network setup processing using the network setup protocol, and advances to steep S211.

If the method using the setup communication protocol is selected in S202, the information processing apparatus 101 starts, in S209, a network setup using the setup communication protocol. FIG. 3B shows an example of the network setup start screen displayed by the setting application. Regions 311, 312, 313, and 314 are displayed on a network setup start screen 310. The region 311 is a region for changing an access point set as a setting target of the network setup. Note that before the region 311 is operated, the access point set as the setting target of the network setup is the access point currently connected to the information processing apparatus 101. If the region 311 is selected, the information processing apparatus 101 displays a list of access points, and newly sets an access point selected from the list by the user as the setting target of the network setup. Note that the list of access points includes access points to which the information processing apparatus 101 has been connected once. The region 312 is a region for inputting the password of the access point set as the setting target. Note that if the setting application can use the password held by the OS, the region 312 need not be displayed. The region 313 is a region for canceling execution of the network setup, and the region 314 is a region for instructing execution of the network setup. If the region 313 is operated, the information processing apparatus 101 ends the processing shown in the sequence chart. If the region 314 is pressed, the information processing apparatus 101 advances to S210.

In S210, the information processing apparatus 101 transmits connection information for connection to the access point set as the setting target of the network setup to the communication apparatus 151 by the setup communication protocol. Note that the connection information includes at least one of pieces of information representing the SSID, password, authentication method, and encryption method of the access point set as the setting target of the network setup. The password transmitted at this time is information input by the user on a screen displayed by an application supported by the OS when the connection between the information processing apparatus 101 and the access point is established. This is information held by the OS when the connection between the information processing apparatus 101 and the access point is established. If the setting application cannot use the password held by the OS, the user needs to newly input a password on the screen displayed by the setting application.

Upon acquiring the connection information in S207 or S210, the communication apparatus 151 stops the network setup mode in S211, and advances to S212.

In S212, the communication apparatus 151 attempts to change the network setting corresponding to the connection information using the connection information. More specifically, the communication apparatus 151 attempts to perform connection to the access point corresponding to the connection information. If the connection succeeds, the communication apparatus 151 can execute communication via the network formed by the connected access point from then on. Note that the communication via the network formed by the connected access point is executed by a protocol (more specifically, for example, Port 9100, SNMP, HTTP, or a protocol unique to the vendor of the communication apparatus 151) different from DPP. Note that the communication apparatus 151 may transmit, to the information processing apparatus 101, information representing whether connection to the access point corresponding to the connection information acquired by WEC succeeds or not. Furthermore, if connection to the access point corresponding to the acquired connection information fails, information representing the cause of the failure may be transmitted to the information processing apparatus 101. The information transmission may be executed using DPP. Note that the connection to the access point corresponding to the acquired connection information fails because a communication error occurs in WEC, the access point cannot be found, or the WEC associated information acquired from the communication apparatus 151 is not appropriate information. The connection fails also because, for example, the authentication method or the encryption method used for connection to the access point set as the setting target is a method that is not supported by the communication apparatus 151. The connection fails also because, for example, the authentication method or the encryption method used for connection to the access point set as the setting target is not supported by the setup method. Note that the information processing apparatus 101 may display, on the display unit 108, information representing whether connection between the communication apparatus 151 and the access point corresponding to the connection information succeeds or not. If the connection between the communication apparatus 151 and the access point corresponding to the acquired connection information fails, information representing the cause of the failure may be displayed on the display unit 108.

In S213, if the network setup by WEC is executed, the information processing apparatus 101 switches, based on the end of the execution of the network setup, the application operating in the foreground from the WEC application to the setting application. Then, the information processing apparatus 101 searches for the communication apparatus 151 on the network to which the information processing apparatus 101 itself belongs. This processing is implemented by the setting application that has received, from the OS, a notification representing that execution of WEC is ended. If the communication apparatus 151 is found, the information processing apparatus 101 requests capability information from the communication apparatus 151, and the communication apparatus 151 transmits the capability information to the information processing apparatus 101. Thus, the information of the communication apparatus 151 is registered on the setting application, and communication with the communication apparatus 151 can be executed by the setting application from then on. More specifically, for example, a print job can be transmitted to the communication apparatus 151 by the setting application. Note that at this time, if the information processing apparatus 101 belongs to the network formed by the access point to which the communication apparatus 151 is connected by WEC, communication with the communication apparatus 151 can be executed via the access point. Furthermore, if communication between the information processing apparatus 101 and the communication apparatus 151 cannot be executed because, for example, the access point to which the communication apparatus 151 is connected is not the access point to which the information processing apparatus 101 is connected, the request or acquisition of capability information is omitted. Note that the communication in S213 is executed using, for example, a communication protocol different from DPP and the setup communication protocol. After that, the information processing apparatus 101 ends the processing shown in the sequence chart.

Note that a form in which the WEC start screen is displayed by the WEC application, and the WEC application executes API of WEC to instruct the OS to execute WEC has been described above. However, the present invention is not limited to this form. For example, the WEC start screen may be displayed by the setting application. In addition, the setting application may execute API of WEC to instruct the OS to execute WEC.

The method using the QR code has been exemplified as the configuration for acquiring the Bootstrapping information. However, the present invention is not limited to this form. For example, short distance wireless communication such as NFC or BLE may be used as the configuration for acquiring the Bootstrapping information. As another configuration, communication by a communication protocol such as SNMP or HTTP via the setup access point activated in the DPP waiting mode may be used.

Next, processing of the DPP waiting mode executed by the communication apparatus 151 in WEC using DPP will be described with reference to FIG. 6. A flowchart shown in FIG. 6 is implemented when, for example, the CPU 154 of the communication apparatus 151 reads out a program stored in the ROM 152 or the like to the RAM 153 and executes the program.

Figure 6:
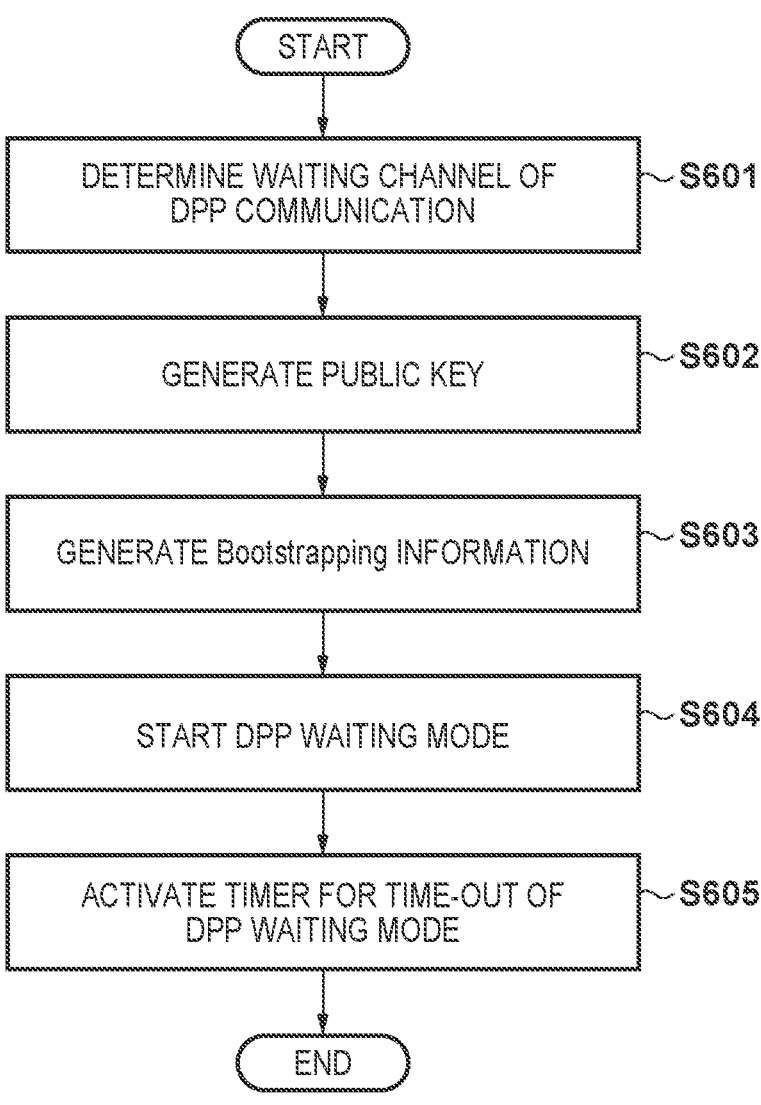
FIG. 6 is a flowchart illustrating processing of a DPP waiting mode.

FIG. 6 is a flowchart illustrating the contents of DPP waiting mode start processing. The flowchart shown in FIG. 6 starts based on, for example, the start of the DPP waiting mode in the communication apparatus 151 in S203.

In step S601, the CPU 154 decides a waiting channel of DPP communication. The waiting channel of DPP communication means a channel that waits for a network setup request by DPP, which is transmitted from the information processing apparatus 101. The same channel is used in the DPP Configuration. Note that which channel is used as the waiting channel of DPP communication may be set, for example, by the user from the operation screen of the communication apparatus 151.

In step S602, the CPU 154 generates the above-described public key information used to perform secure communication with the information processing apparatus 101.

In step S603, the CPU 154 generates the above-described Bootstrapping information. The Bootstrapping information includes, for example, the identification information (the MAC address or the like) of the communication apparatus 151, information concerning the waiting channel of the DPP communication, and the public key information generated in step S602.

In step S604, the CPU 154 starts the DPP waiting mode. If the DPP waiting mode is started, communication in the DPP Authentication can be performed between the communication apparatus 151 and the information processing apparatus 101.

In step S605, the CPU 154 activates a timer for a time-out of the DPP waiting mode. Note that if a predetermined time elapses from the start of the operation in the DPP waiting mode, the CPU 154 stops the operation in the DPP waiting mode. By stopping the operation in the DPP waiting mode, the process transitions to network setup processing using the network setup protocol.

FIGS. 4A to 4F each show an example of the User Interface (UI) of the communication apparatus 151. In this example, a case where the operation unit 159 and the display unit 161 are configured as an operation display unit formed from a touch panel display will be described but the present invention is not limited to this. Since these are examples of the UI, designs, messages, details of the UI arrangement and the like are not limited to those shown in FIGS. 4A to 4F.

A copy function button 401, a scan function button 402, a wireless LAN simple setting button 403, and another setting button 404 are displayed on an idle screen 400. The copy function button 401 is a button for displaying the menu of the copy function of the communication apparatus 151. The scan function button 402 is a button for displaying the menu of the scan function of the communication apparatus 151. The wireless LAN simple setting button 403 is a button for starting the wireless LAN simple setting function of the communication apparatus 151, and a network setup of the communication apparatus 151 is executed by the wireless LAN simple setting function. That is, in this embodiment, the pressing of this button can be one of triggers for starting the DPP waiting mode. Note that the trigger for starting the DPP waiting mode is not limited to the pressing of the button. For example, a user operation different from the operation via the operation unit 159 or reception of a specific signal from an external apparatus such as the information processing apparatus 101 may be used as a trigger. A practical example of the user operation different from the operation via the operation unit 159 is a power-on operation by pressing the power button of the communication apparatus 151. Practical examples of the reception of the specific signal from the external apparatus such as the information processing apparatus 101 are reception of a specific BLE beacon and reception of specific wireless LAN communication. The other setting button 404 is a button for displaying the menu of the other setting function of the communication apparatus 151. Processing executed when each of the copy function button 401, the scan function button 402, and the other setting button 404 is pressed is not included in the contents of the processing of the DPP waiting mode to be described here, and a description thereof will be omitted. A wireless LAN simple setting processing-in-progress screen 410 is temporarily displayed when performing start processing or stop processing of the wireless LAN simple setting, cancel processing, update processing of the WEC associated information, or the like.

A wireless LAN simple setting main screen 420 is a screen displayed while the communication apparatus 151 operates in the DPP waiting mode, and a WEC associated information region 421 and a cancel button 422 are displayed on the screen. The WEC associated information region 421 is a region for performing display concerning the WEC associated information, and the WEC associated information is encoded into a QR code and displayed in this embodiment. In this embodiment, as an example of the configuration for outputting the WEC associated information, the QR code is displayed on the display unit 161. That is, if another configuration is used as the configuration for outputting the WEC associated information, different contents may be displayed in the WEC associated information region 421. If, for example, short distance wireless communication using NFC is used as the configuration for outputting the WEC associated information, a message of "please do NFC touch" or the like may be displayed in the WEC associated information region 421. If communication by a communication protocol such as SNMP or HTTP via the setup access point is used as another configuration, a message of "please operate setting application" or the like may be displayed in the WEC associated information region 421. The cancel button 422 is a button for canceling the operation of the communication apparatus 151 in the DPP waiting mode. Upon the pressing of this button, the communication apparatus 151 accepts a cancel instruction. That is, in this embodiment, the pressing of this button can be one of triggers for stopping the DPP waiting mode. Note that the trigger for stopping the DPP waiting mode is not limited to the pressing of the button. For example, a user operation different from the operation via the operation unit 159 or reception of a specific signal from an external apparatus such as the information processing apparatus 101 may be used as a trigger. A practical example of the user operation different from the operation via the operation unit 159 is a power-off operation by pressing the power button of the communication apparatus 151. Practical examples of the reception of the specific signal from the external apparatus such as the information processing apparatus 101 are reception of a specific BLE beacon and reception of specific wireless LAN communication. Furthermore, if reception of the connection information succeeds by executing the processing of the wireless LAN simple setting function, the DPP waiting mode can be stopped. If a time-out of a timer indicating the time limit of the DPP waiting mode occurs, the DPP waiting mode can be stopped.

A wireless LAN simple setting completion screen 430 is a screen indicating the completion of the wireless LAN simple setting function, and an OK button 431 is displayed on the screen. Upon the pressing of the OK button 431, the display of the display unit 161 returns to the idle screen 400. A wireless LAN simple setting cancel screen 440 is a screen indicating the stop of the wireless LAN simple setting function by a cancel instruction, and an OK button 441 is displayed on the screen. Upon the pressing of the OK button 441, the display of the display unit 161 returns to the idle screen 400. A wireless LAN simple setting time-out screen 450 is a screen indicating the completion of the wireless LAN simple setting by a time-out, and an OK button 451 is displayed on the screen. Upon the pressing of the OK button 451, the display of the display unit 161 returns to the idle screen 400.

Processing of selecting the network setup method to be executed by the information processing apparatus 101 in a network setup will be described with reference to FIGS. 5A and 5B.

Processing in step S501 corresponds to the processing executed by the setting application operating on the information processing apparatus 101 in S201 of FIG. 2. In step S501, the CPU 103 acquires network setup information to be used to select the setup method in the succeeding stage. More specifically, the CPU 103 acquires connection destination access point information from the information processing apparatus 101, and acquires capability information from each of the information processing apparatus 101 and the communication apparatus 151. The information processing apparatus 101 may acquire network setup information from the communication apparatus 151 using, for example, short distance wireless communication such as NFC or BLE.

The connection destination access point information acquired from the information processing apparatus 101 includes a security method (authentication method and encryption method) used for connection between the information processing apparatus 101 and the access point. The capability information acquired from the information processing apparatus 101 includes information concerning at least one of the following.

Whether the information processing apparatus 101 supports the network setup by the WEC method (the method using DPP)

Whether the information processing apparatus 101 supports the network setup with the access point of the security method (authentication method and encryption method) using the authentication server by the WEC method (the method using DPP)

Whether the information processing apparatus 101 supports the network setup with the access point by the WEC method (the method using DPP)

The capability information acquired from the communication apparatus 151 includes information concerning at least one of the following.

Whether the communication apparatus 151 supports the network setup by the WEC method (the method using DPP)

Whether the communication apparatus 151 supports the network setup with the access point of the security method using the authentication server by the WEC method (the method using DPP)

Whether the communication apparatus 151 supports the network setup with the access point of the security method using the authentication server by the method using the setup communication protocol Note that the capability information may be included in advance in the setting application. That is, the information processing apparatus 101 may specify capability information corresponding to the communication apparatus 151 from a plurality of pieces of capability information prepared as a list for the respective types or models of communication apparatuses included in advance in the setting application, and acquire the specified capability information from the setting application.

Processes in steps S502 to S510 indicate selection processing of selecting the network setup method to be executed by the setting application operating on the information processing apparatus 101 in S202 of FIG. 2. That is, this is selection processing of selecting one of the WEC method (the method using DPP) and the method using the setup communication protocol using the capability information acquired in step S501.

In step S502, the CPU 103 determines, based on the connection destination access point information acquired in step S501, whether the information processing apparatus 101 has already been connected to the access point before the network setup is performed. More specifically, if it is determined that the information processing apparatus 101 has been connected to the access point by Wi-Fi, the process advances to step S503. If it is determined that the information processing apparatus 101 has not been connected to the access point by Wi-Fi before the network setup is performed, the method using the setup communication protocol is selected as the network setup method to be executed, and the process advances to step S514. In step S514, the CPU 103 designates, for the communication apparatus 151, the connection destination access point as the setting target of the network setup. This processing corresponds to the processing in S209 of FIG. 2. After step S514, in step S515, the CPU 103 transmits, to the communication apparatus 151, by the setup communication protocol, connection information for connection to the access point designated as the setting target of the network setup. This processing corresponds to the processing in S210 of FIG. 2.

Even if an attempt is made to execute the network setup by the WEC method in a case where it is determined that the information processing apparatus 101 has not been connected to the access point by Wi-Fi, information (SSID and password) for connection to the access point is not stored in the information processing apparatus 101. Therefore, even if WEC is executed, it is necessary to prompt the user to newly input the password of the access point on the screen of the information processing apparatus 101. Since the OS performs sequence control of WEC of the information processing apparatus 101, detailed error control cannot be performed. To cope with this, if it is determined that the information processing apparatus 101 has not been connected to the access point by Wi-Fi, the method using the setup communication protocol is selected as the network setup method. In this embodiment, with this arrangement, the network setup method is decided so that the setting application designates the connection destination access point and controls a connection request, thereby making it possible to prevent a connection failure in the network setup.

In step S503, the CPU 103 determines, based on the capability information acquired in step S501, whether the communication apparatus 151 supports the security method used for the connection between the information processing apparatus 101 and the access point. Examples of the security method supported by the communication apparatus 151 are Wi-Fi Protected Access (WPA)-PSK, WPA2-PSK, WPA3-SAE, WPA-EAP, WPA2-EAP, WPA3-EAP, and Open (without encryption). Examples of the security method not supported by the communication apparatus 151 are Open (WEP-Open) and Shared Key authentication (WEP-Shared). If it is determined that the communication apparatus 151 supports the security method used for the connection between the information processing apparatus 101 and the access point, the process advances to step S504. On the other hand, if it is determined that the communication apparatus 151 does not support the security method, the method using the setup communication protocol is selected as the network setup method to be executed, and the process advances to step S514.

In this way, in this embodiment, if the communication apparatus 151 does not support the security method used for the connection between the information processing apparatus 101 and the access point, the method using the setup communication protocol is selected, thereby allowing the user to designate the access point. As a result, it is possible to prevent a connection failure in the network setup.

In step S504, the CPU 103 determines, based on the connection destination access point information acquired in step S501, whether the security method used for the connection between the information processing apparatus 101 and the access point is the method supporting WEC (DPP). Note that examples of the security method supporting WEC are WPA2-PSK, WPA3-SAE, WPA2-EAP, and WPA3-EAP. On the other hand, examples of the security method not supporting WEC are WPA-PSK, Open (without encryption), Open (WEP-Open), and Shared Key authentication (WEP-Shared). If it is determined that the security method used for the connection between the information processing apparatus 101 and the access point is the method supporting WEC, the process advances to step S505. On the other hand, if it is determined that the security method is not the method supporting WEC, the method using the setup communication protocol is selected as the network setup method to be executed, and the process advances to step S514.

Figure 5B:
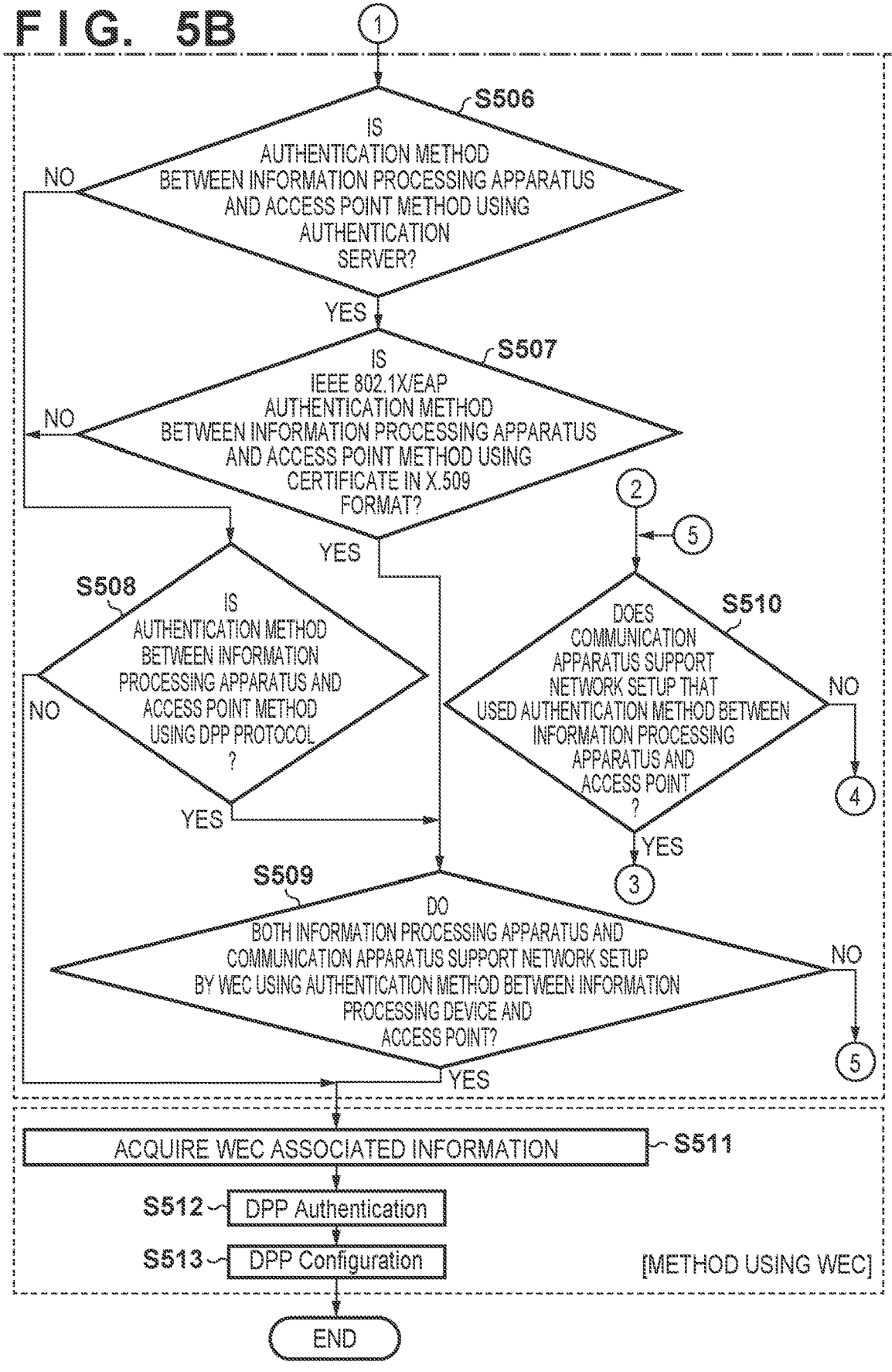

In FIGS. 5A and 5B, if it is determined in step S504 that the security method is not the method supporting WEC, the method using the setup communication protocol may be selected as the network setup method to be executed, and the process may advance to step S510.

In step S510, the CPU 103 determines, based on the capability information acquired in step S501, whether the security method that can be designated for the communication apparatus 151 in the network setup by the method using the setup communication protocol includes the security method used for the connection between the information processing apparatus 101 and the access point. In this example, examples of the security method that can be designated for the communication apparatus 151 are Wi-Fi Protected Access (WPA)-PSK, WPA2-PSK, WPA3-SAE, WPA-EAP, WPA2-EAP, WPA3-EAP, and Open (without encryption). Examples of the security method that cannot be designated for the communication apparatus 151 are DPP, WEP-Open, and WEP-Shared. If it is determined that the security method that can be designated for the communication apparatus 151 in the network setup by the method using the setup communication protocol includes the security method used for the connection between the information processing apparatus 101 and the access point, the process advances to step S515; otherwise, the process advances to step S514.

In this way, according to this embodiment, if the security method used for the connection between the information processing apparatus 101 and the access point is not the method supporting WEC (DPP), the method using the setup communication protocol is selected. If the security method that can be designated for the communication apparatus 151 in the network setup by the method using the setup communication protocol does not include the security method used for the connection between the information processing apparatus 101 and the access point, the user is allowed to designate the access point. In this embodiment, with this arrangement, it is possible to prevent a connection failure in the network setup.

In step S505, the CPU 103 determines, based on the capability information acquired in step S501, whether both the information processing apparatus 101 and the communication apparatus 151 support WEC (the method using DPP). Note that the information processing apparatus 101 may determine whether WEC is supported, based on the information held in advance in the setting application or based on the information acquired from the communication apparatus 151. If it is determined that both the information processing apparatus 101 and the communication apparatus 151 support WEC, the process advances to step S506. If it is determined that at least one of the information processing apparatus 101 and the communication apparatus 151 does not support WEC, the method using the setup communication protocol is selected as the network setup method to be executed, and the process advances to step S510.

In this way, according to this embodiment, it is possible to prevent a failure of the network setup caused by executing the WEC method although one of the information processing apparatus 101 and the communication apparatus 151 does not support WEC.

At the timing when the process advances from step S505 to step S506, it is determined that the security method used for the connection between the information processing apparatus 101 and the access point is the method supporting WEC and both the information processing apparatus 101 and the communication apparatus 151 support WEC.

In this embodiment, in addition, in steps S506 to S508, the security method used for the connection between the information processing apparatus 101 and the access point is identified. If the security method used for the connection between the information processing apparatus 101 and the access point satisfies a predetermined condition, the network setup method to be executed is selected based on the pieces of information (OS versions, types, models, regions, and the like) of the information processing apparatus 101 and the communication apparatus 151. In this embodiment, with this arrangement, by performing more detailed determination with respect to the security method satisfying the predetermined condition, it is possible to prevent a failure of the network setup.

In step S506, the CPU 103 determines, based on the connection destination access point information acquired in step S501, whether the security method used for the connection between the information processing apparatus 101 and the access point is the method using the authentication server. Note that examples of the security method using the authentication server are WPA1-EAP, WPA2-EAP, and WPA3-EAP. If it is determined that the security method is the method using the authentication server, the process advances to step S507; otherwise, the process advances to step S508.

In step S507, the CPU 103 determines, based on the connection destination access point information acquired in step S501, whether the IEEE802.1X/EAP authentication method used for the connection between the information processing apparatus 101 and the access point is the method using a certificate in the X.509 format. Note that examples of the IEEE802.1X/EAP authentication method using the certificate in the X.509 format (the certificate format defined by RFC5280) are EAP-TLS and EAP-TTLS. Note that an example of the IEEE802.1X/EAP authentication method not using the certificate in the X.509 format is EAP-PEAP. If it is determined that the IEEE802.1X/EAP authentication method is the method using the certificate in the X.509 format, the process advances to step S509; otherwise, the process advances to step S508.

In step S508, the CPU 103 determines, based on the connection destination access point information acquired in step S501, whether the security method used for the connection between the information processing apparatus 101 and the access point is the method using the DPP protocol. If it is determined that the security method is the method using the DPP protocol, the process advances to step S509; otherwise, the WEC method is selected as the network setup method to be executed, and the process advances to step S511.

In step S509, the CPU 103 determines, based on the capability information acquired in step S501, whether both the information processing apparatus 101 and the communication apparatus 151 support the network setup by WEC using the security method used for the connection between the information processing apparatus 101 and the access point. If it is determined that both the information processing apparatus 101 and the communication apparatus 151 support the network setup, the WEC method is selected as the network setup method to be executed, and the process advances to step S511. On the other hand, if it is not determined that both the information processing apparatus 101 and the communication apparatus 151 support the network setup, the method using the setup communication protocol is selected as the network setup method to be executed, and the process advances to step S510.

An effect of performing the determination processing in step S509 will now be described.

Examples of the security method that can be designated for the information processing apparatus 101 and the communication apparatus 151 in the network setup by the WEC method are WPA2-PSK, WPA3-SAE, WPA2-EAP, and WPA3-EAP. On the other hand, examples of the security method that cannot be designated for the information processing apparatus 101 and the communication apparatus 151 in the network setup by the WEC method are DPP, WPA-PSK, Open (without encryption), Open (WEP-Open), and Shared Key authentication (WEP-Shared). Whether the security method can be designated changes depending on the type, model, region, and OS version of the information processing apparatus 101 and the type, model, and region of the communication apparatus 151. The security method that can be designated can be different between the information processing apparatus 101 and the communication apparatus 151.

For example, in accordance with the WEC and WPA3 standards, if the type of the apparatus can support WEC, the apparatus supports connection to the access point using WPA2-PSK or WPA3-SAE. However, with respect to connection to the access point using WPA2-EAP, WPA3-EAP, or DPP, the presence/absence of support changes depending on the type, the model, and the like. Even if the apparatus supports connection to the access point using WPA2-EAP, WPA3-EAP, or DPP, whether WPA2-EAP, WPA3-EAP, or DPP can be designated for the information processing apparatus 101 and the communication apparatus 151 in the network setup using the WEC method changes depending on the OS version, type, model, and the like. In this case, if the security method can be designated, this means that the security method can be designated in the DPP Configuration in S207.

In a case where one of the information processing apparatus 101 and the communication apparatus 151 does not support connection to the access point using WPA2-EAP, WPA3-EAP, or DPP or a case where one of the information processing apparatus 101 and the communication apparatus 151 cannot designate WPA2-EAP, WPA3-EAP, or DPP in the network setup using the WEC method, if WPA2-EAP, WPA3-EAP, or DPP is designated in the network setup using the WEC method, the network setup fails. To cope with this, in this embodiment, if the information processing apparatus 101 and the access point are connected by the security method for which the presence/absence of support is arbitrary in accordance with the WEC standard, not only confirmation of whether the security method supports WEC but also more detailed confirmation is performed. That is, based on the pieces of capability information acquired by the setting application from the information processing apparatus 101 and the communication apparatus 151, it is confirmed whether the security method can be designated in the network setup using the WEC method. In this embodiment, with this arrangement, the appropriate network setup method can be selected based on the information of the OS version, type, model, region, and the like, thereby making it possible to prevent a connection failure in the network setup.

Processes in steps S511 to S513 indicate processing in a case where the WEC method is selected as the network setup method to be executed by the information processing apparatus 101. In step S511, the CPU 103 acquires the WEC associated information from the communication apparatus 151. This processing corresponds to the processing in S204 of FIG. 2. Next, in step S512, the CPU 103 executes the DPP Authentication processing with the communication apparatus 151. This processing corresponds to the processing in S206 of FIG. 2. Next, in step S513, the CPU 103 executes the DPP Configuration processing with the communication apparatus 151. This processing corresponds to the processing in S207 of FIG. 2.

According to this embodiment, as described above, it is possible to provide a function of causing the communication apparatus 151 to join the wireless infrastructure network formed by the access point 131 connected to the information processing apparatus 101.

In this embodiment, the network setup method is dynamically switched in accordance with the security method used for the connection between the information processing apparatus 101 and the access point and the pieces of capability information acquired from the information processing apparatus 101 and the communication apparatus 151. With this arrangement, it is possible to prevent occurrence of an unintended connection failure caused by executing the combination of the security method and the network setup method, which is not supported by the information processing apparatus 101 or the communication apparatus 151, thereby improving convenience.

In this embodiment, as an example, an arrangement in which when performing the network setup by the method not using WEC, the communication apparatus 151 is connected to the wireless infrastructure network formed by the access point 131 to which the information processing apparatus 101 is connected has been explained. However, if the network setup by the method not using WEC (the method using the setup communication protocol) is executed, setting may be performed so that the information processing apparatus 101 is connected to the access point operating in the P2P mode of the communication apparatus 151. For example, setting may be performed so that the information processing apparatus 101 is connected to the communication apparatus 151 in the AP mode in which the communication apparatus 151 operates as an access point or the WFD mode in which the communication apparatus 151 performs communication by Wi-Fi Direct (WFD). If such setting is performed, the information processing apparatus 101 may acquire, in S201 or S210 of FIG. 2, from the communication apparatus 151, the connection information (S SID and password) of the access point enabled in the communication apparatus 151.

In this embodiment, selection of the network setup method based on the combination of the security method used for the connection between the information processing apparatus 101 and the access point and the pieces of capability information acquired from the information processing apparatus 101 and the communication apparatus 151 has been described. In this embodiment, the information processing apparatus 101 selects the network setup method. However, as long as the same effect is achieved, other arrangements may be adopted. For example, the information processing apparatus 101 may transmit the information of the security method and the capability information to the communication apparatus 151. Then, the communication apparatus 151 may select the network setup method based on the combination of the information of the security method acquired from the information processing apparatus 101, the capability information acquired from the information processing apparatus 101, and the capability information of the communication apparatus 151. At this time, the communication apparatus 151 may transmit, to the information processing apparatus 101, information of the setup method to be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-088881, filed May 31, 2022, which is hereby incorporated by reference herein in its entirety.

What is claimed is:

1. A non-transitory computer-readable storage medium storing a program configured to cause a computer of an information processing apparatus capable of communicating with a communication apparatus to function, in a case where a network setup for causing the communication apparatus to connect to an access point existing outside the information processing apparatus and the communication apparatus is performed, to:

acquire, as network setup information, information of a security method used between the information processing apparatus and the access point to which the information processing apparatus, is connected, and information indicating whether the information processing apparatus supports the network setup based on a predetermined standard;

acquire, as the network setup information, information of a security method supported by the communication apparatus, and information indicating whether the communication apparatus supports the network setup based on the predetermined standard:

based on the acquired network setup information, perform the network setup by a first method as the network setup based on the predetermined standard, on at least a condition that the security method used between the information processing apparatus and the access point is supported by the communication apparatus and is supported by the network setup based on the predetermined standard; and in a case where the condition is not satisfied, perform the network setup by a second method different from the first method.

2. The medium according to claim 1, wherein the network setup method by the first method as the network setup based on the predetermined standard is a network setup method using DPP (Device Provisioning Protocol).

3. The medium according to claim 1, wherein each of the network setup information of the information processing apparatus and the network setup information of the communication apparatus is information obtained based on at least one of an OS version, a type, a model, and a region.

4. The medium according to claim 1, wherein the network setup by the first method as the network setup based on the predetermined standard is performed on at least a condition that the security method used between the information processing apparatus and the access point is an authentication method using an authentication server, and the authentication method is supported by the communication apparatus and is supported by the network setup by the first method as the network setup based on the predetermined standard.

5. The medium according to claim 4, wherein the authentication method using the authentication server is an IEEE802.1X/EAP authentication method.

6. The medium according to claim 1, wherein the network setup by the first method as the network setup based on the predetermined standard is performed on at least a condition that the security method used between the information processing apparatus and the access point is an authentication method using an authentication server and is an authentication method using a predetermined certificate, and the authentication method is supported by the communication apparatus and is supported by the network setup by the first method as the network setup based on the predetermined standard.

7. The medium according to claim 1, wherein the program is configured to accept a selection of an access point to which the communication apparatus is to be connected by the network setup, in a case where the security method used between the information processing apparatus and the access point is not supported by the communication apparatus.

8. The medium according to claim 7, wherein the program is configured to, in the network setup, transmit information of the selected access point to the communication apparatus.

9. The medium according to claim 1, wherein in a case where the network setup by the first method is performed, Bootstrapping information is acquired from the communication apparatus.

10. The medium according to claim 9, wherein communication with the communication apparatus is established based on the Bootstrapping information, and information of the access point is transmitted by the communication.

11. A method of operating a computer of an information processing apparatus capable of communicating with a communication apparatus, in a case where a network setup for causing the communication apparatus to connect to an access point existing outside the information processing apparatus and the communication apparatus is performed, comprising:

acquiring, as network setup information, information of a security method used between the information processing apparatus and the access point to which an information processing apparatus, is connected, and information indicating whether the information processing apparatus supports the network setup based on a predetermined standard;

acquiring, as the network setup information, information of a security method supported by the communication apparatus, and information indicating whether the communication apparatus supports the network setup based on the predetermined standard;

based on the acquired network setup information, perform the network setup by a first method as the network setup based on the predetermined standard, on at least a condition that the security method used between the information processing apparatus and the access point is supported by the communication apparatus and is supported by the network setup based on the predetermined standard; and in a case where the condition is not satisfied, perform the network setup by a second method different from the first method.

\* \* \* \* \*